(12) United States Patent
Deganis et al.

(10) Patent No.: US 9,254,907 B2
(45) Date of Patent: Feb. 9, 2016

(54) HOOP LOAD BEARING AIRCRAFT TRANSPARENCY

(75) Inventors: Luis E. Deganis, New Market, AL (US); Di Song, Hunstville, AL (US); Sherman D. Stewart, Scottsboro, AL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 327 days.

(21) Appl. No.: 13/041,471

(22) Filed: Mar. 7, 2011

(65) Prior Publication Data

US 2012/0228428 A1 Sep. 13, 2012

(51) Int. Cl.
*E06B 3/964* (2006.01)
*B64C 1/14* (2006.01)

(52) U.S. Cl.
CPC .................................. *B64C 1/1492* (2013.01)

(58) Field of Classification Search
CPC ...... B64C 1/1492; B64C 1/14; B64C 1/1407; B64C 1/1476; B64C 1/1484; F16B 3/06; F16B 19/02
USPC ..................................... 52/204.62; 244/129.3
See application file for complete search history.

(56) References Cited

U.S. PATENT DOCUMENTS

| | | | |
|---|---|---|---|
| 2,834,998 A | 5/1958 | Wilder | |
| 3,331,642 A * | 7/1967 | Krauss | 384/153 |
| 3,919,022 A * | 11/1975 | Stefanik | 156/104 |
| 4,046,933 A * | 9/1977 | Stefanik | 428/81 |
| 4,078,107 A * | 3/1978 | Bitterice et al. | 428/38 |
| 4,204,374 A | 5/1980 | Olson | |
| 4,324,373 A * | 4/1982 | Zibritosky | 244/121 |
| 5,002,820 A * | 3/1991 | Bolton et al. | 428/215 |
| 5,251,986 A * | 10/1993 | Arena | 384/272 |
| 5,366,577 A * | 11/1994 | Hart et al. | 156/222 |
| 5,796,055 A | 8/1998 | Benson, Jr. et al. | |
| 2011/0097554 A1 * | 4/2011 | Kehrl et al. | 428/174 |

FOREIGN PATENT DOCUMENTS

FR  903214  9/1945

OTHER PUBLICATIONS

PCT Search Report, PCT/US2012/022890, filed Jan. 27, 2012, mailed Jun. 21, 2012.

* cited by examiner

*Primary Examiner* — Mark Wendell
(74) *Attorney, Agent, or Firm* — Andrew C. Siminerio

(57) ABSTRACT

An aircraft transparency includes a first ply having a first major surface and a second major surface. A second ply is spaced from the first ply and has a third major surface and a fourth major surface. A polymeric interlayer is located between the first and second plies. At least one bore extends through the first and second plies and the interlayer. A high strength bushing is located in the bore, with an outer sidewall of the bushing in direct contact with the material of the first and second plies. In one embodiment, the bore is a tapered bore and the bushing has a tapered outer sidewall. In another embodiment, the bore is a cylindrical bore and the bushing has a cylindrical outer sidewall.

13 Claims, 3 Drawing Sheets

HOOP LOAD BEARING AIRCRAFT TRANSPARENCY

BACKGROUND OF THE INVENTION

1. Field of the Invention

This invention relates generally to aircraft transparencies and, in one particular embodiment, to a hoop load bearing polymeric aircraft window.

2. Technical Considerations

A pressurized aircraft fuselage undergoes a range of stress during normal operation due to the internal and external pressure differential and environmental conditions. This pressure differential causes the hollow aircraft fuselage to expand when the internal pressure is greater than the external pressure. As the fuselage expands, the openings in the fuselage in which the aircraft windows are held also expand or enlarge. This edge displacement at the opening can be resisted by what it is commonly known as "hoop loaded" windows. This type of window design assists in reducing the stress in the airframe by sharing some of the hoop load bearing responsibility with the fuselage. In other words, the window is completely integrated to the airframe and resists and transfers load through its structural members.

Glass is a relatively strong material and is widely used for hoop loaded bearing windows. These glass windows are held in place by fiberglass straps that are attached to the aircraft fuselage. In a desire to decrease the weight of the aircraft to increase fuel efficiency, it would be desirable to replace glass aircraft windows with lighter weight polymeric windows. However, while polymeric windows are lighter than glass windows and are easier to form into complex shapes, polymeric windows are not as mechanically strong as glass windows and are not used in hoop loaded applications. Therefore, it would be advantageous to devise an efficient interface that would allow for the use of polymeric windows in applications where hoop load bearing is desired.

SUMMARY OF THE INVENTION

A hoop load bearing aircraft transparency comprises at least one polymeric ply. At least one bore extends through the at least one ply. A bushing is located in the at least one bore and is in direct contact with the at least one ply.

Another hoop load bearing aircraft transparency comprises a first ply having a first major surface and a second major surface. A second ply is spaced from the first ply and has a third major surface and a fourth major surface. A polymeric interlayer is located between the first and second plies. At least one bore extends through the first and second plies and the interlayer. A bushing is located in the bore, with an outer sidewall of the bushing in direct contact with the material of the first and second plies. This bushing can be made of any material that is able to transfer load to the bore wall. This material could be, for example, metallic or non-metallic material such as, but not limited to, metals, ceramics, polymers, or composites. In one embodiment, the bore is a tapered bore and the bushing has a tapered outer sidewall. In another embodiment, the bore is a cylindrical bore and the bushing has a cylindrical outer sidewall.

Another hoop load bearing aircraft transparency comprises a first acrylic ply having a first major surface and a second major surface and a second acrylic ply spaced from the first ply and having a third major surface and a fourth major surface. A polymeric interlayer is located between the first and second plies. At least one tapered bore extends through the first and second plies and the interlayer. A tapered bushing is located in the bore, with an outer sidewall of the bushing in direct contact with the material of the first and second plies.

A further hoop load bearing aircraft transparency comprises a first acrylic ply having a first major surface and a second major surface and a second acrylic ply spaced from the first ply and having a third major surface and a fourth major surface. A polymeric interlayer is located between the first and second plies. At least one cylindrical bore extends through the first and second plies and the interlayer. A cylindrical bushing is located in the bore, with an outer sidewall of the bushing in direct contact with the material of the first and second plies.

An additional hoop load bearing aircraft transparency comprises a first stretched acrylic ply spaced from a second stretched acrylic ply. A polymeric interlayer is located between the first and second plies. At least one bore extends through the first ply, the second ply, and the interlayer. The bore has an inner wall. A metallic bushing is located in the bore. The bushing has an outer sidewall in direct contact with the inner wall of the bore. In one non-limiting embodiment, the outer sidewall of the bushing is tapered.

A method is provided for transferring hoop load in an aircraft transparency having at least one stretched acrylic ply with at least one bore located in the at least ply and defining an inner wall. The method comprises providing a bushing having an outer sidewall in the bore such that the outer sidewall of the bushing is in direct contact with the inner wall of the bore.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
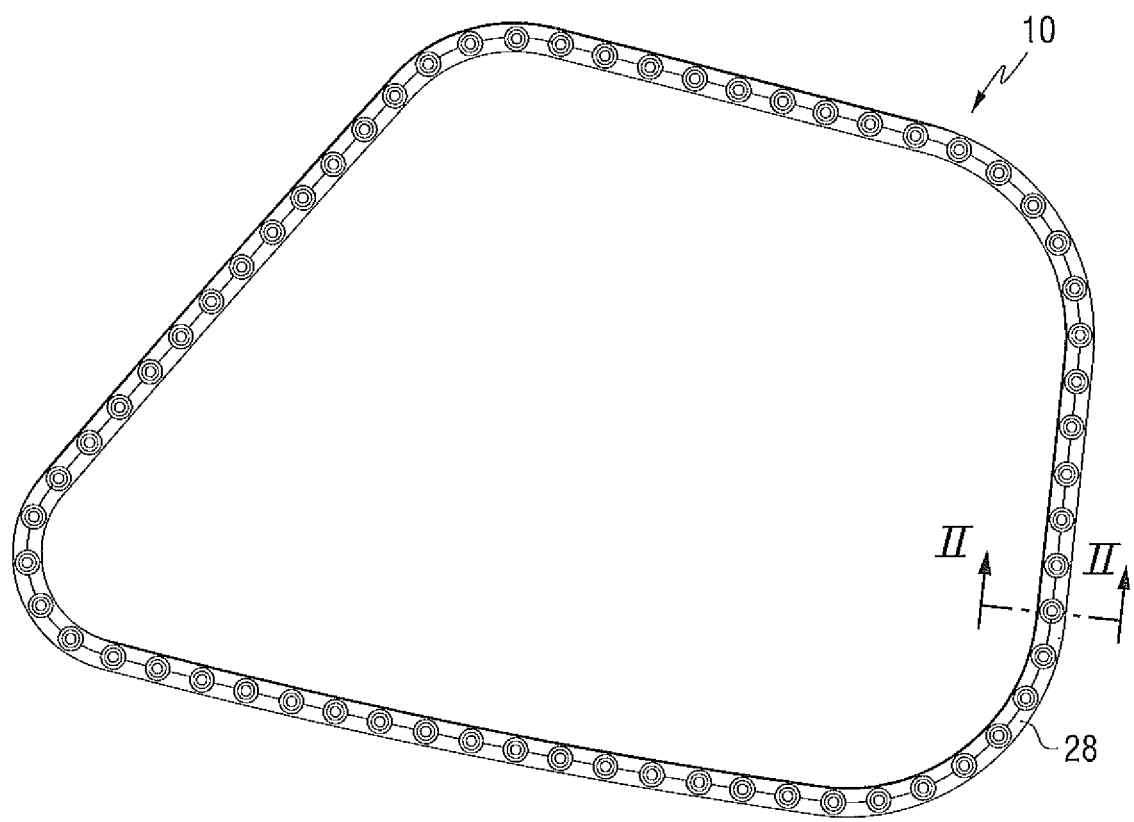
FIG. 1 is a plan view of an aircraft transparency of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on an underlying surface but not necessarily in direct contact with the surface. For example, a layer "formed over" a substrate does not preclude the presence of one or more other layers or films of the same or different composition located between the formed layer and the substrate. As used herein, the term "film" refers to a coating region of a desired or selected coating composition. A "layer" can comprise one or more "films". A "coating" or "coating stack" can comprise one or more "layers". As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 780 nm. The terms "infrared region" or "infrared radiation" refer to electromagnetic radiation having a wavelength in the range of greater than 780 nm to 100,000 nm. The terms "ultraviolet region" or "ultraviolet radiation" mean electromagnetic energy having a wavelength in the range of 100 nm to less than 380 nm. Additionally, all documents, such as but not limited to, issued patents and patent applications, referred to herein are to be considered to be "incorporated by reference" in their entirety.

For purposes of the following discussion, the invention will be discussed with reference to use with a vehicle transparency, particularly an aircraft transparency in the form of an aircraft lateral window. However, it is to be understood that the invention is not limited to use with aircraft lateral windows but could be practiced with transparencies in any desired field, such as, but not limited to, laminated or non-laminated residential and/or commercial windows, insulating glass units, and/or transparencies for land, air, space, above water, and underwater vehicles. Therefore, it is to be understood that the specifically disclosed exemplary embodiments are presented simply to explain the general concepts of the invention and that the invention is not limited to these specific exemplary embodiments.

Figure 2:
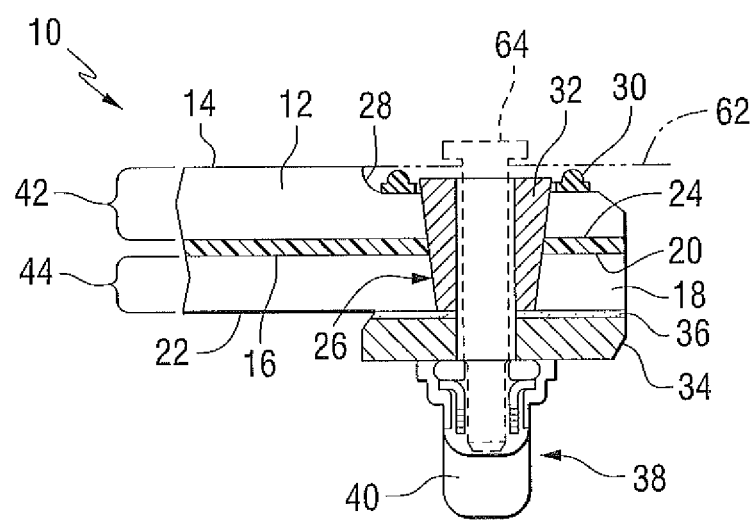
FIG. 2 is a sectional view taken along the line II-II of FIG. 1 showing an attachment assembly of the invention incorporating a tapered bushing.

A non-limiting aircraft transparency 10 (e.g., cabin window assembly or cockpit window assembly) incorporating features of the invention is illustrated in FIGS. 1 and 2. The transparency 10 can have any desired visible light, infrared radiation, or ultraviolet radiation transmission and reflection. For example, the transparency 10 can have a visible light transmission of any desired amount, e.g., greater than 0% up to 100% at a reference wavelength of 550 nanometers (nm). In one non-limiting embodiment, the visible light transmission at a reference wavelength of 550 nm can be at least 20%, such as at least 30%, such as at least 40%, such as at least 50%, such as at least 60%, such as at least 70%, such as at least 80%, and/or such as at least 90%. The transparency 10 can have any desired shape and can be of any desired thickness suitable for a desired application.

As shown in FIGS. 1 and 2, the transparency 10 has a plurality of fastening members at or near the outer periphery of the transparency 10 to attach the transparency 10 to the aircraft fuselage. The specific structure of these fastening members will be described more particularly with reference to FIG. 2. The transparency 10 includes a first ply 12 (outer ply) with a first major surface 14 facing the aircraft exterior, i.e., an outer major surface (No. 1 surface) and an opposed second or inner major surface 16 (No. 2 surface). The transparency 10 also includes a second ply 18 (inner ply) having an outer (first) major surface 20 (No. 3 surface) and an inner (second) major surface 22 (No. 4 surface). This numbering of the ply surfaces is in keeping with conventional practice. The plies 12, 18 are attached by an interlayer 24, such as a polymeric interlayer. A bore 26 is formed through the transparency 10, i.e., through the first ply 12, interlayer 24, and second ply 18, and defines a bore wall or inner wall. In the illustrated embodiment, a portion of the outer surface of the first ply 12, at the outer periphery of the ply 12, is thinner than the body of the ply 12 to form a groove 28 running around the outer perimeter of the first ply 12. A gasket 30 is positioned in the groove 28 and has a hole aligning with the bore 26. A bushing 32, e.g., a metallic bushing, is inserted into the bore 26. A retainer 34, such as an aluminum retainer, is attached to the second ply 18 by an adhesive 36. An attachment device, such as a nutplate 38, is attached to the retainer 34. The nutplate 38 includes a threaded nut 40 to engage a fastening element, such as a threaded bolt 64, extending through the bushing 32. This nutplate fastening configuration is simply one example of how the transparency 10 can be secured to the aircraft fuselage and should not be considered as limiting. The above described attachment system is just one exemplary way to attach the transparency 10 to the aircraft and should not be considered as limiting. The transparency 10 can be secured using any conventional method or device.

In the broad practice of the invention, the plies 12, 18 of the transparency 10 can be of the same or different materials and can include any desired material having any desired characteristics. For example, one or more of the plies 12, 18 can be transparent or translucent to visible light. By "transparent" is meant having visible light transmission of greater than 0% up to 100%. Alternatively, one or more of the plies 12, 18 can be translucent. By "translucent" is meant allowing electromagnetic energy (e.g., visible light) to pass through, but diffusing this energy such that objects on the side opposite the viewer are not clearly visible. Examples of suitable materials for the plies 12, 18 include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or combinations of any of the above. In one non-limiting embodiment, both of the plies 12, 18 are made of a polymeric material, such as stretched acrylic.

The first and second plies 12, 18 can be of any desired dimensions, e.g., length, width, shape, or thickness. However, as can be appreciated by those skilled in the art, increasing the thickness of the plies 12, 18, beyond that needed to withstand the rigors of flight, undesirably increases the weight of the transparency 10. For example, and without limiting the present invention, for many applications, a ply thickness ranging from 0.1 inch to 1.0 inch (0.25 cm to 2.54 cm), such as 0.1 inch to 0.5 inch (0.25 cm to 1.27 cm, such as 0.20 inch to 0.40 inch (0.51 cm to 1.02 cm) is acceptable to withstand the rigors of flight. In one particular non-limiting embodiment, the plies 12, 18 are both stretched acrylic and each have a thickness ranging from 0.25 inch to 0.35 inch (0.64 cm to 0.89 cm), such as 0.25 inch to 0.3 inch (0.64 cm to 0.76 cm). Also, the plies 12, 18 need not be of identical thickness. For example, in one non-limiting embodiment, the first (outer) ply 12 can have a thickness 42 in the range of 0.25 inch to 0.35 inch (0.64 cm to 0.89 cm), such as 0.30 inch (0.76 cm) and the second (inner) ply 18 can have a thickness 44 in the range of 0.2 inch to 0.3 inch (0.51 cm to 0.76 cm), such as 0.25 inch (0.64 cm).

The interlayer 24 can be of any desired material and can include one or more layers or plies. The interlayer 24 can be a polymeric or plastic material, such as, for example, polyvinylbutyral, plasticized polyvinyl chloride, or multi-layered thermoplastic materials including polyethyleneterephthalate, polyurethanes, etc. The interlayer 24 secures the first and second plies together, provides energy absorption, reduces noise, and increases the strength of the laminated structure. The interlayer 24 can also be a sound-absorbing or attenuating material as described, for example, in U.S. Pat. No. 5,796,055. The interlayer 24 can have a solar control coating provided thereon or incorporated therein or can include a colored material to reduce solar energy transmission. In one non-limiting embodiment, the interlayer 24 has a thickness in the range of 0.02 inch to 0.5 inch (0.05 cm to 1.27 cm), such as 0.02 inch to 0.1 inch (0.05 cm to 0.25 cm), such as 0.02 inch to 0.08 inch (0.05 cm to 0.2 cm), such as 0.03 inch to 0.07 inch (0.076 cm to 0.178 cm), such as 0.04 inch to 0.06 inch (0.1 cm to 0.15 cm), such as 0.05 inch (0.13 cm). An example of a suitable interlayer material is S123 urethane sheet commercially available from Sierracin Corporation of Sylmar, Calif.

Figure 3:
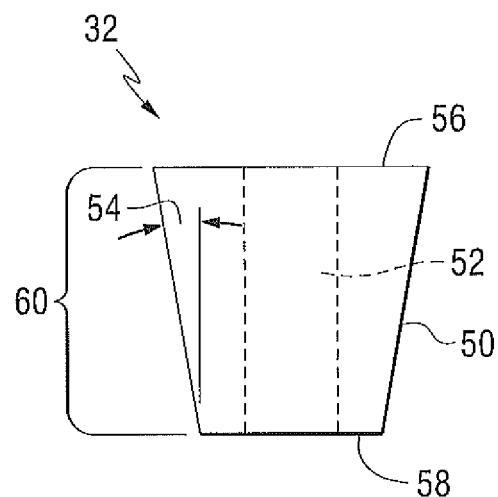
FIG. 3 is a side, sectional view of the tapered bushing of FIG. 2.
Figure 4:
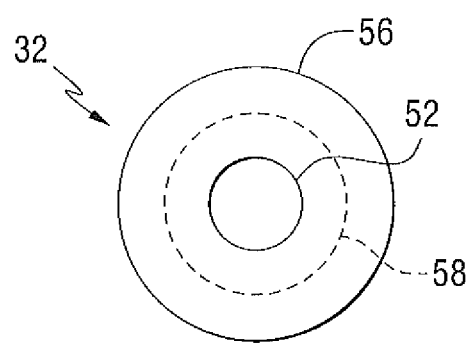
FIG. 4 is a plan view of the tapered bushing of FIG. 3.

In the embodiment shown in FIG. 2, the bore 26 extending through the transparency 10 is a tapered bore having an outer diameter (i.e., the diameter in the outer surface 14 of the first ply 12) larger than an inner diameter (i.e., the diameter in the inner surface 22 of the second ply 18). As shown in FIGS. 2-4, the bushing 32 is a tapered bushing having a tapered exterior sidewall 50 and a central bore 52. As shown in FIGS. 3 and 4, the tapered bushing 32 can have a taper angle 54 in the range of 1° to 20°, such as 5° to 15°, such as 10°. The bushing 32 can have an outer diameter at its wide end 56 in the range of 0.25 inch to 1.5 inch (0.63 cm to 3.8 cm), such as 0.25 inch to 1 inch (0.63 cm to 2.54 cm), such as 0.3 inch to 0.8 inch (0.76 cm to 2 cm), such as 0.4 inch to 0.6 inch (1 cm to 1.5 cm), such as 0.5 inch to 0.6 inch (1.27 cm to 1.5 cm), such as 0.563 inch±0.003 inch (1.43 cm±0.008 cm). The bushing 32 can have an outer diameter at its narrow end 58 in the range of 0.1 inch to 1.5 inch (0.25 cm to 3.8 cm), such as 0.2 inch to 1 inch (0.5 cm to 2.54 cm), such as 0.25 to 0.8 inch (0.63 cm to 2 cm), such as 0.25 inch to 0.5 inch (0.63 cm to 1.27 cm), such as 0.3 inch to 0.4 inch (0.76 cm to 1 cm), such as 0.376 inch±0.003 inch (0.96 cm±0.008 cm). The bore 52 can have a diameter in the range of 0.05 inch to 1 inch (0.127 cm to 2.54 cm), such as 0.1 inch to 0.8 inch (0.25 cm to 2 cm), such as 0.1 inch to 0.5 inch (0.25 cm to 1.27 cm), such as 0.1 inch to 0.3 inch (0.25 cm to 0.76 cm), such as 0.1 inch to 0.2 inch (0.25 cm to 0.5 cm), such as 0.195 inch±0.005 inch (0.495 cm±0.013 cm). The bushing 32 can have a length 60 in the range of 0.25 inch to 2.5 inch (0.64 cm to 6.35 cm), such as 0.3 inch to 2 inch (0.76 cm to 5 cm), such as 0.3 inch to 1.5 inch (0.76 cm to 3.8 cm), such as 0.3 inch to 1 inch (0.76 cm to 2.54 cm), such as 0.3 inch to 0.8 inch (0.76 cm to 2 cm), such as 0.4 inch to 0.6 inch (0.1 cm to 1.5 cm), such as 0.5 inch to 0.6 inch (1.27 cm to 1.5 cm), such as 0.529 inch±0.01 inch (1.34 cm±0.024 cm).

When positioned in the bore 26, the exterior wall 50 of the bushing 32 is in direct contact with the plies 12, 18. That is, there is no buffer material or stack absorbing material between the exterior wall 50 of the bushing 32 and the inner wall of the bore 26.

As shown in FIG. 2, to install the transparency 10 in an aircraft fuselage, the transparency 10 is positioned in the window opening with the groove 28 and gasket 30 pressed against the fuselage or a framework 62 forming an outer boundary of the opening. A connector, such as a conventional threaded bolt 64, can be inserted through a hole in the framework 62, through the central bore 52 of the bushing 32, and into the nut 40. As the bolt 64 is screwed into the nut 40 of the nutplate 38, the gasket 30 is compressed to maintain a seal between the transparency 10 and the aircraft framework 62. The outer sidewall 50 of the metal bushing 32 is in direct contact with the material of the first and second plies 12, 18. It has been discovered that the tapered outer wall 52 of the bushing 32 provides a more efficient load transfer through bearing on the bushing-polymer ply interface for single shear joints. No additional gaskets or rubber sleeves are needed between the bushing 32 and the plies 12, 18. As the fuselage undergoes changes in pressure differential, the aircraft framework 62 expands. The hoop load developed is transferred directly into the transparency 10 causing the transparency 10 to bend or flex. In single shear joints, such as the one used in the current example, the reaction loads at the top of the fastener cause the fastener to rotate. This condition would reduce the efficiency of the bearing load transfer from the bushing to the wall of the bore for loose, thin cylindrical hole-bushing joints. This is due to the fact that the contact area diminishes and a stress concentration point is originated at the top of the bore, where the rotated bushing touches the top edge of the hole. This rotation can be counteracted in part by using the tapered bushing, allowing for a more efficient bearing load transfer. Since the sidewall 50 of the bushing 32 is tapered, part of the rotation is precluded by generating a reaction component normal to the wall of the bore. That component is then also resisted by bearing transfer at the interface. A tight fit and a wide base also assist in precluding the rotation of the fastener.

The load is distributed more evenly across the sidewall 50 and the stress is reduced by augmenting the effective bearing area. Then, by limiting the rotation of the pin extending through the bushing, increasing the bearing area and reducing the stress; the resulting interface allows for a viable hoop loaded polymeric window.

Figure 5:
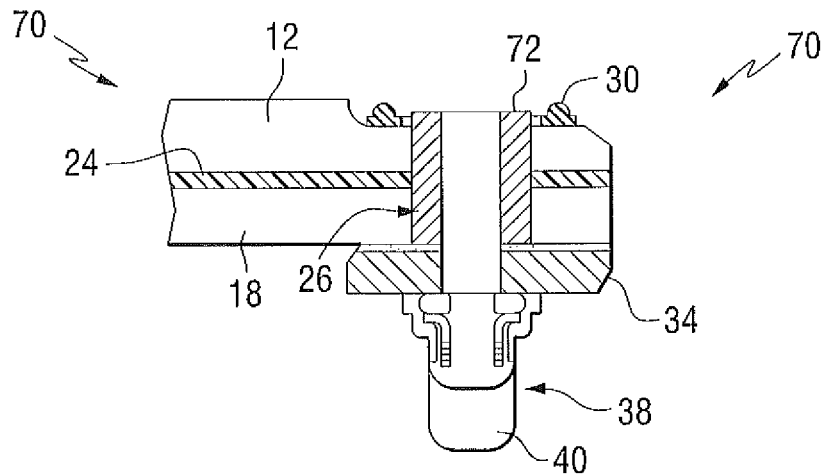
FIG. 5 is a sectional view of an attachment assembly similar to FIG. 3 but incorporating a cylindrical bushing.

FIG. 5 shows another transparency 70 of the invention. The transparency 70 is similar to the transparency 10 previously described except that it incorporates a thick cylindrical bushing 72 rather than the tapered bushing 30 previously described. The bore 26 in the transparency 70 is therefore a cylindrical bore rather than a tapered bore. This is a simplified version of the interface previously mentioned that counteracts the rotation of the fastener by means of a tight fit and a wide base. The top and bottom of the bushing are in contact with the outboard airframe skin and inboard retainer. Due to the relatively large diameter of the bushing, the joint resists the rotation by heel and toe effect in both airframe and retainer. The thick high strength bushing achieves a similar bearing strength as the tapered bushing by augmenting the bearing area due to its large relative diameter. This type of interface has the advantage of manufacturing simplicity. Again, there is no additional material between the exterior wall of the bushing 72 and the interior wall of the bore in which it is located.

Figure 6:
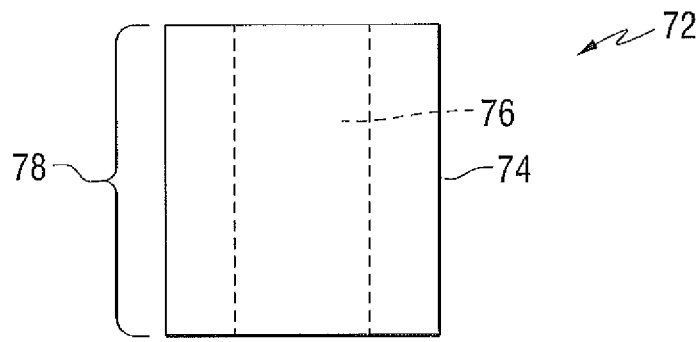
FIG. 6 is a side, sectional view of the cylindrical bushing of FIG. 5.
Figure 7:
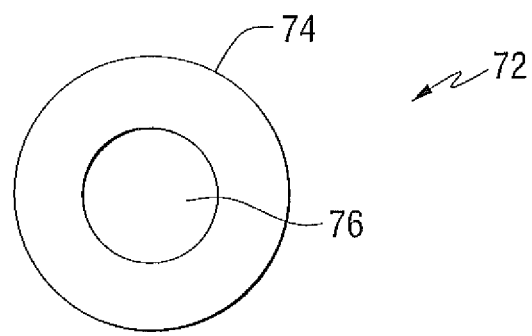
FIG. 7 is a plan view of the cylindrical bushing of FIG. 6.

As shown in FIGS. 6 and 7, the bushing 72 is a cylindrical bushing having an exterior wall 74 and a central bore 76. The bushing 72 can have an outer diameter in the range of 0.25 inch to 1.5 inch (0.63 cm to 3.8 cm), such as 0.25 inch to 1 inch (0.63 cm to 2.54 cm), such as 0.3 inch to 0.8 inch (0.76 cm to 2 cm), such as 0.4 inch to 0.6 inch (1 cm to 1.5 cm), such as 0.4 inch to 0.5 inch (1 cm to 1.27 cm), such as 0.490 inch±0.003 inch (1.24 cm±0.008 cm). The bore 76 can have a diameter in the range of 0.05 inch to 1 inch (0.127 cm to 2.54 cm), such as 0.1 inch to 0.8 inch (0.25 cm to 2 cm), such as 0.1 inch to 0.5 inch (0.25 cm to 1.27 cm), such as 0.1 inch to 0.3 inch (0.25 cm to 0.76 cm), such as 0.1 inch to 0.2 inch (0.25 cm to 0.5 cm), such as 0.195 inch±0.005 inch (0.495 cm±0.013 cm). The bushing 72 can have a length 78 in the range of 0.25 inch to 2.5 inch (0.64 cm to 6.35 cm), such as 0.3 inch to 2 inch (0.76 cm to 5 cm), such as 0.3 inch to 1.5 inch (0.76 cm to 3.8 cm), such as 0.3 inch to 1 inch (0.76 cm to 2.54 cm), such as 0.3 inch to 0.8 inch (0.76 cm to 2 cm), such as 0.4 inch to 0.6 inch (0.1 cm to 1.5 cm), such as 0.5 inch to 0.6 inch (1.27 cm to 1.5 cm), such as 0.529 inch±0.01 inch (1.34 cm±0.024 cm).

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A hoop load bearing aircraft transparency, comprising:
    a first ply having a first major surface on an exterior of the transparency, having an outer periphery and a groove on the first major surface about a perimeter of the first ply and extending to the outer periphery of the first ply, and a second major surface opposite the first major surface, wherein the first ply is transparent or translucent, and wherein the first major surface forms part of an aircraft exterior;
    a second ply spaced from the first ply and having a third major surface and a fourth major surface opposite the third major surface, wherein the second ply is transparent or translucent;
    at least one polymeric interlayer positioned between said second major surface of said first ply and said third major surface of said second ply and, wherein the at least one polymeric layer attaches the first ply to the second ply;
    at least one bore within the groove, having an inner wall, and extending through the at least one polymeric interlayer, the first ply and the second ply; and
    a bushing located in the at least one bore and in direct contact with the at least one interlayer, the first ply and the second ply,
    wherein the inner wall of the bore is tapered and the bushing has a tapered outer sidewall, the tapered bore and outer sidewall having a greater diameter at the first surface than at the fourth surface.

2. The transparency of claim 1, wherein the first ply comprises stretched acrylic.

3. The transparency of claim 1, wherein the polymeric interlayer comprises a material selected from the group consisting of polyvinylbutyral, plasticized polyvinyl chloride, polyethylene terephthalate, and polyurethane.

4. The transparency of claim 1, wherein the first ply has a different thickness than the second ply.

5. The transparency of claim 1, wherein the bushing comprises a material selected from metal, ceramic, polymer, and combinations thereof.

6. The transparency of claim 1, wherein the bushing has a taper angle in the range of 1° to 20°.

7. The transparency of claim 1, wherein the first and second plies have a thickness in the range of 0.2 inch to 0.4 inch.

8. The transparency of claim 7, wherein the first ply has a different thickness than the second ply.

9. The transparency of claim 7, wherein the bushing comprises a material selected from the group consisting of metal, ceramic, polymer, and combinations thereof.

10. The transparency of claim 1, wherein no gasket or rubber sleeve is placed between the bushing and the first ply, or the bushing and the second ply.

11. A hoop load bearing aircraft transparency, comprising:
    a first stretched acrylic ply having a first major surface on an exterior of the transparency, having an outer periphery and a groove on the first major surface about a perimeter of the first ply and extending to the outer periphery of the first ply, and a second major surface opposite the first major surface and spaced from a second stretched acrylic ply having a third major surface and a fourth major surface opposite the third major surface and, wherein the first stretched acrylic ply is transparent or translucent, wherein the second stretched acrylic ply is transparent or translucent and wherein the first major surface forms a part of an aircraft exterior;
    a polymeric interlayer located between, and attaching the first and second plies;
    at least one bore within the groove, having an inner wall, and extending through the first ply, the second ply, and the interlayer, the bore defining an inner wall; and
    a metallic bushing located in the bore, the bushing having an outer sidewall in direct contact with the inner wall of the bore,
    wherein the inner wall of the bore is tapered and the bushing has a tapered outer sidewall, the tapered bore and outer sidewall having a greater diameter at the first surface than at the fourth surface.

12. The transparency of claim 11, wherein no gasket or rubber sleeve is placed between the bushing and the first stretched acrylic ply, or the bushing and the second stretched acrylic ply.

13. A method of transferring hoop load in an aircraft transparency comprising a transparent or translucent first ply having a first outer major surface on an exterior of the transparency, having an outer periphery and a groove on the first major surface about a perimeter of the first ply and extending to the outer periphery of the first ply, and a second major surface opposite the first outer major surface, and a transparent or translucent second ply spaced from the first ply and having a third major surface and a fourth major surface opposite the third major surface, and having at least one bore located in the groove of the at least one ply and extending through the first ply and the second ply, and defining an inner wall, the method comprising:
    providing a bushing having an outer sidewall in the bore such that the sidewall of the outer bushing is in direct contact with the inner wall of the bore,
    wherein the inner wall of the bore is tapered and the bushing has a tapered outer sidewall, the tapered bore and outer sidewall having a greater diameter at the first surface than at the fourth surface, and
wherein the first outer major surface forms part of an aircraft exterior.

* * * * *